(12) United States Patent
Hung

(10) Patent No.: US 9,786,233 B2
(45) Date of Patent: Oct. 10, 2017

(54) ELECTRONIC LABEL SYSTEM

(71) Applicant: E Ink Holdings Inc., Hsinchu (TW)

(72) Inventor: Chi-Mao Hung, Taoyuan (TW)

(73) Assignee: E Ink Holdings Inc., Hsinchu (TW)

( * ) Notice: Subject to any disclaimer, the term of this patent is extended or adjusted under 35 U.S.C. 154(b) by 15 days.

(21) Appl. No.: 14/883,630

(22) Filed: Oct. 15, 2015

(65) Prior Publication Data

US 2016/0035291 A1 Feb. 4, 2016

Related U.S. Application Data

(63) Continuation-in-part of application No. 13/533,978, filed on Jun. 27, 2012, now Pat. No. 9,197,704.

(30) Foreign Application Priority Data

Jun. 28, 2011 (TW) .............................. 100122639 A

(51) Int. Cl.
*H04Q 5/22* (2006.01)
*G09G 3/36* (2006.01)
(Continued)

(52) U.S. Cl.
CPC .............. *G09G 3/36* (2013.01); *H04L 51/06* (2013.01); *H04L 67/12* (2013.01); *H04L 67/125* (2013.01);
(Continued)

(58) Field of Classification Search
CPC .......... G09G 2370/16; G09G 2380/04; G09G 3/344; G09G 2300/023; G09G 2340/0492;
(Continued)

(56) References Cited

U.S. PATENT DOCUMENTS 6,924,781 B1 * 8/2005 Gelbman .............. G06F 3/1454
340/10.6
7,013,289 B2 3/2006 Horn et al.
(Continued)

FOREIGN PATENT DOCUMENTS

CN 101390112 3/2009
CN 201345111 11/2009
(Continued)

*Primary Examiner* — Daniel Previl
(74) *Attorney, Agent, or Firm* — Jianq Chyun IP Office

(57) ABSTRACT

An electronic label system including a control unit and a plurality of electronic label units is provided. The control unit transmits wireless power. The electronic label units are coupled to the control unit. The electronic label units respectively output a plurality of state information to the control unit, so that the control unit monitors operation states of the electronic label units according to the state information. The state information is transmitted to the control unit when a state of the electronic label units is varied. The control unit transmits the wireless power to the electronic label units by using wireless communications, and the electronic label units are charged with the wireless power. Furthermore, a wired communication interface is used as the communication interface between the net unit and the electronic label units in the electronic label system, so that the cost of the electronic label system is reduced.

20 Claims, 5 Drawing Sheets

(51) Int. Cl.
 *H04L 29/08* (2006.01)
 *H04L 12/58* (2006.01)

(52) U.S. Cl.
 CPC .......... *H04L 67/26* (2013.01); *H04L 67/2823* (2013.01); *H04L 67/303* (2013.01)

(58) Field of Classification Search
 CPC ......... G09G 2356/00; G09G 2360/144; G09G 5/003; G09G 3/36; G06F 3/147; G06F 3/1454; G06F 1/1601; G06F 1/1605; G06F 1/1694
 USPC ....... 340/10.6, 825.49, 825.52, 825.53, 10.4, 340/10.42, 10.5, 10.51, 10.52, 825.72, 340/825.76, 309.4, 331
 See application file for complete search history.

(56) References Cited

U.S. PATENT DOCUMENTS

| | | | |
|---|---|---|---|
| 7,514,646 B2 | 4/2009 | Cira et al. | |
| 8,072,314 B1 | 12/2011 | Kuzma et al. | |
| 8,441,351 B2 | 5/2013 | Christopher | |
| 2002/0034067 A1* | 3/2002 | Massaro | A47F 5/0068 361/728 |
| 2002/0165007 A1* | 11/2002 | Gawne | G06K 17/0022 455/557 |
| 2004/0036626 A1 | 2/2004 | Chan et al. | |
| 2004/0263316 A1 | 12/2004 | Dix et al. | |
| 2008/0089255 A1* | 4/2008 | Graves | H04W 8/22 370/310 |
| 2010/0124920 A1 | 5/2010 | Feher | |
| 2010/0268776 A1* | 10/2010 | Gerke | G06Q 10/10 709/204 |
| 2011/0240731 A1* | 10/2011 | Lee | G06Q 30/06 235/375 |

FOREIGN PATENT DOCUMENTS

| | | |
|---|---|---|
| CN | 201765774 | 3/2011 |
| CN | 201876908 | 6/2011 |
| TW | I250457 | 3/2006 |
| TW | 200847039 | 12/2008 |
| TW | 200919228 | 5/2009 |
| TW | I311734 | 7/2009 |

\* cited by examiner

ELECTRONIC LABEL SYSTEM

CROSS-REFERENCE TO RELATED APPLICATION

This application is a continuation-in-part application of and claims the priority benefit of a prior application Ser. No. 13/533,978, filed on Jun. 27, 2012, now allowed, which claims the priority benefit of Taiwan application serial no. 100122639, filed on Jun. 28, 2011. The entirety of each of the above-mentioned patent applications is hereby incorporated by reference herein and made a part of this specification.

BACKGROUND OF THE INVENTION

Field of the Invention

The invention relates to an electronic system thereof. Particularly, the invention relates to an electronic label system.

Description of Related Art

In recent years, the display is broadly used in consumer products, for example, it is increasingly demanded by, for example, e-signage, e-tag, e-book, smart card and e-POP. In particular, when the wireless constructions and digital science and technology become mature day by day, the display has become a vital electronic product.

In an electronic label system, the control unit thereof usually transmits messages to each of label nodes through a wireless signal, while each the label node displays according to the received message, so that each label node can be disposed as will without wiring issue. However, since the messages are transmitted between the control unit and each the label node through the wireless signal, the cost of the electronic label system is accordingly increased, which results in a lower chance to select the electronic label system for use. In this regard, how to reduce the cost of the electronic label system becomes one of important issues to be improved for the relevant manufactures. Furthermore, how to charge electronic label units of the electronic label system is also an important issue.

SUMMARY OF THE INVENTION

Accordingly, the invention is directed to an electronic label system, which uses a wired network to replace partial wireless network so as to reduce the hardware cost thereof.

The invention is also directed to an electronic label system, which charges electronic label units thereof by using wireless communications.

The invention provides an electronic label system including a control unit, a first net unit, a second net unit, and a plurality of electronic label units. The control unit sends display information. The first net unit is coupled to the control unit, and configured to convert the display information into a display signal. The second net unit is coupled to the first net unit, and configured to receive the display signal and output a display control signal. The electronic label units is coupled in series to the second net unit. The electronic label units are configured to receive the display control signal and respectively display according to the corresponding display control signal. The electronic label units respectively output a plurality of state information to the control unit, so that the control unit monitors operation states of the electronic label units according to the state information. The state information is transmitted to the control unit when a state of the electronic label units is varied.

The invention provides an electronic label system including a control unit and a plurality of electronic label units. The control unit transmits wireless power. The electronic label units are coupled to the control unit. The electronic label units are configured to respectively output a plurality of state information to the control unit, so that the control unit monitors operation states of the electronic label units according to the state information. The state information is transmitted to the control unit when a state of the electronic label units is varied. The control unit transmits the wireless power to at least one of the electronic label units by using wireless communications, and the at least one of the electronic label units are charged with the wireless power.

According to the above descriptions, in exemplary embodiments of the invention, a wired communication interface is used as the communication interface between the second net unit and the electronic label units in the electronic label system, so that the cost of the electronic label system is reduced. In addition, the electronic label units of the electronic label system are wirelessly chargeable.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
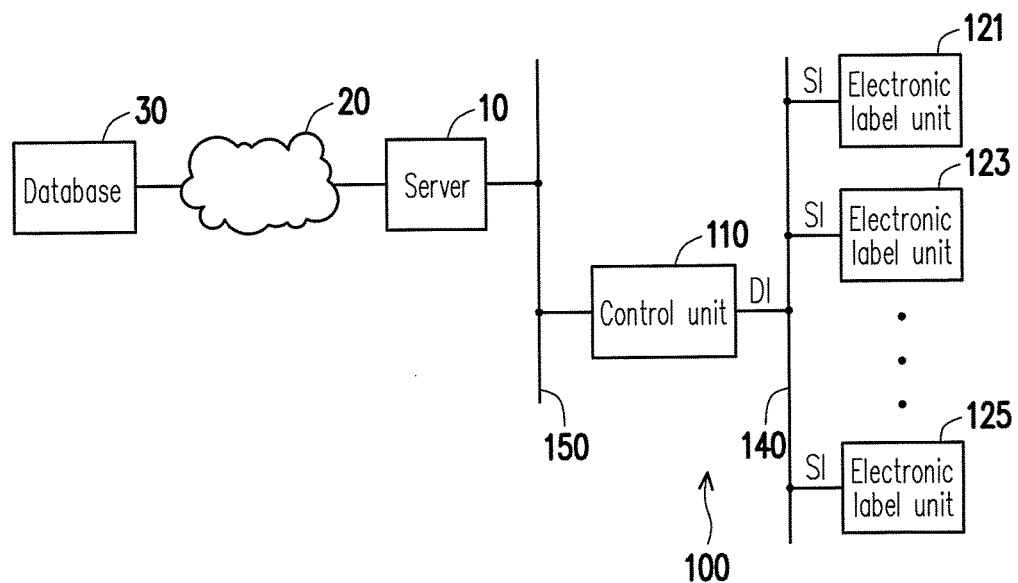
FIG. 1 is a system schematic diagram of an electronic label system according to an embodiment of the invention.

FIG. 1 is a system schematic diagram of an electronic label system according to an embodiment of the invention. Referring to FIG. 1, in the present embodiment, the electronic label system 100 includes a control unit 110 and a plurality of electronic label units (for example, 121, 123 and 125). The control unit 110 is used for sending display information DI. The electronic label units 121, 123 and 125 are coupled to the control unit 110 through a wiring 140 for receiving the display information DI and displaying according to the corresponding display information DI, respectively. The wiring 140 can be an Ethernet wiring, an inter-integrated circuit wiring, a serial peripheral wiring, an RS232 wiring or an ARM bus wiring, i.e. the electronic label units 121, 123 and 125 can be coupled to the control unit 110 through an Ethernet interface, an inter-integrated circuit interface, a serial peripheral interface, an RS232 interface or an ARM bus interface.

Moreover, the electronic label units 121, 123 and 125 transmit respective state information SI to the control unit 110 through the wiring 140, so that the control unit 110 can monitor operation states of the electronic label units 121, 123 and 125 according to the state information SI, where the state information SI, for example, includes a part of, all of or one of an operating temperature, an operating voltage, a display resolution and a display panel type of the electronic label unit (121, 123 or 125), which can be determined by those skilled in the art. The state information SI can be transmitted when the states of the electronic label units (121, 123 and 125) are varied, when the system is booted, or once every predetermined period (for example, 5 seconds), which can be determined by those skilled in the art.

Moreover, the control unit 110 can adjust a message content, a size or a format of the display information DI according to the respective state information SI of the electronic label units 121, 123 and 125, so that the display information DI transmitted to the electronic label units 121, 123 and 125 can be correctly received. In the present embodiment, the electronic label units 121, 123 and 125 can respectively correspond to an address, and the display information DI may include address information, so that the electronic label units 121, 123 and 125 can receive and identify the corresponding display information DI.

On the other hand, in an embodiment of the invention, the wiring 150 can be the Ethernet wiring, i.e. the control unit 110 can be coupled to a server 10 through the Ethernet wiring 150, so as to obtain the display data corresponding to each of the electronic label units 121, 123 and 125 from the server 10, and accordingly generate the display information DI corresponding to each of the electronic label units 121, 123 and 125. Moreover, the server 10 can be coupled to a database 30 through a virtual private network 20 established in a wide area network, so as to update the display information DI corresponding to each of the electronic label units 121, 123 and 125 through the database 30. In other embodiments, the server 10 can be coupled to the database 30 through a local area network, though the invention is not limited thereto. Moreover, the server 10 can receive a remote command, and outputs display data to the control unit 110 according to the remote command, so as to control a part of, all of or one of display images of the electronic label units 121, 123 and 125 through the display information DI sent by the control unit 110.

Figure 2:
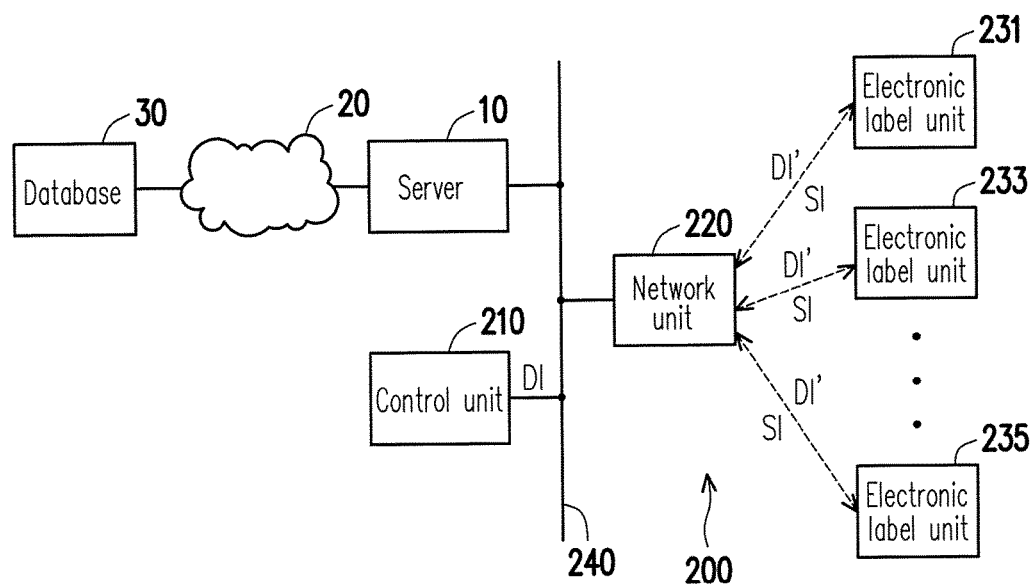
FIG. 2 is a system schematic diagram of an electronic label system according to another embodiment of the invention.

FIG. 2 is a system schematic diagram of an electronic label system according to another embodiment of the invention. Referring to FIG. 1 and FIG. 2, the differences between the electronic label system 100 and the electronic label system 200 lie in a control unit 210, a network unit 220 and electronic label units 231, 233 and 235. In the present embodiment, a wiring 240 is, for example, the Ethernet wiring, i.e. the network unit 220 can be coupled to the control unit 210 through the Ethernet. However, in other embodiments, the network unit 220 can be coupled to the control unit 210 through the inter-integrated circuit interface wiring, the serial peripheral interface wiring, the RS232 interface wiring or the ARM bus wiring. The electronic label units 231, 233 and 235 can be coupled to the network unit 220 through one of the WiFi communication protocol, the ZigBee communication protocol and the 3G mobile communication protocol.

The control unit 210 transmits the display information DI to the electronic label units 231, 233 and 235 through the network unit 220 via wireless signals (i.e. wireless signals DI'), so that the electronic label units 231, 233 and 235 respectively display according to the corresponding display information DI (i.e. the wireless display signals DI'). Moreover, the electronic label units 231, 233 and 235 respectively transmit the corresponding state information SI to the network unit 220 through the wireless signals, so as to transmit the state information SI to the control unit 210 through the network unit 220. The above wireless signals can be wireless signals that comply with one of the WiFi communication protocol, the ZigBee communication protocol and the 3G mobile communication protocol, or can be other types of radio frequency signals, which are not limited by the invention.

The control unit 210 monitors operation states of the electronic label units 231, 233 and 235 according to the received state information SI, and adjusts a message content, a size or a format of the display information DI according to the respective state information SI of the electronic label units 231, 233 and 235, so that the display information DI transmitted to the electronic label units 231, 233 and 235 can be correctly received.

Figure 3A:
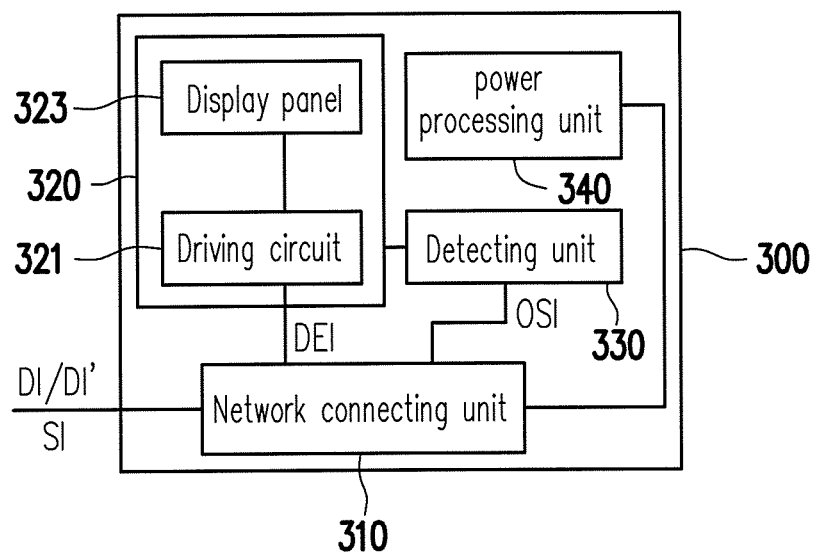
FIG. 3A is a block schematic diagram of an electronic label unit according to an embodiment of the invention.
Figure 3B:
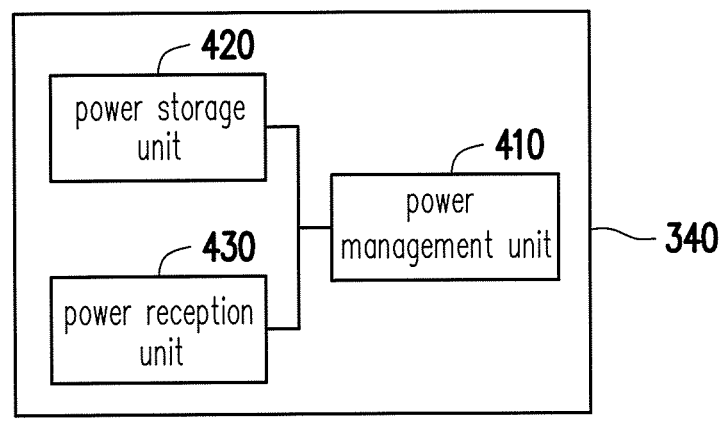
FIG. 3B is a block schematic diagram of a power processing unit in FIG. 3A according to an embodiment of the invention.

FIG. 3A is a block schematic diagram of an electronic label unit according to an embodiment of the invention. FIG. 3B is a block schematic diagram of a power processing unit in FIG. 3A according to an embodiment of the invention. Referring to FIG. 3A and FIG. 3B, the electronic label unit 300 may be applied to the electronic label system 100 or the electronic label system 200, i.e. the electronic label unit 300 may be one of the electronic label units 121, 123 and 125, or may be one of the electronic label units 231, 233 and 235. In the present embodiment, the electronic label unit 300 includes a network connecting unit 310, a display unit 320, a detecting unit 330, and a power processing unit 340. The display unit 320 includes a driving circuit 321 and a display panel 323.

Referring to FIG. 1 and FIG. 3A, in different embodiments, the network connecting unit 310 is coupled to the control unit 110 or the network unit 220 for receiving the display information DI/DI' and outputting the state information SI. The driving circuit 321 is coupled to the display panel 323 and the network connecting unit 310 for driving the display panel 323 according to the display information DI/DI' received by the network connecting unit 310. The display panel 323 can be a liquid crystal display (LCD) panel or an electrophoretic display panel, though the invention is not limited thereto. Moreover, the driving circuit 321 outputs device information DEI to the network connecting unit 310, where the device information DEI may include one of or all of a resolution of the display panel (i.e. a display resolution) and a type of the display panel (i.e. a display panel type).

The detecting unit 330 is coupled to the network connecting unit 310 and the display unit 320 for detecting operation state information OSI of the display unit 320, and outputting the operation state information OSI to the network connecting unit 310, where the operation state information OSI may include one of or all of an operating temperature and an operating voltage of the display unit 320. The network connecting unit 310 receives the device information DEI and/or the operation state information OSI, and outputs the corresponding state information SI according to the device information DEI and/or the operation state information OSI.

Referring to FIGS. 3A and 3B, the power processing unit 340 includes a power management unit 410, a power storage unit 420, and a power reception unit 430 in the present embodiment. The power management unit 410 may monitor the stored wireless power, and request transmission of the wireless power from the network unit 220 such that wireless power is received in a power state. Specifically, in the case in which the electronic label unit 300 is set, by the power management unit 410, to be in the power state in which update data is not received, the power management unit 350 may control the power reception unit 430, such that the wireless power supplied from the control unit 110 or 210 is received in the power state. The power reception unit 430 may include a reception antenna for power reception. The power storage unit 420 may store the wireless power received by the power reception unit 430, and charges the electronic label unit 300 by using the wireless power. The power reception unit 430 may receive the wireless power transmitted from the network unit 220. In a magnetic resonance method, as an example, the power reception unit 430 may include a resonance reception coil which receives wireless power by resonating with a resonance frequency.

Figure 4:
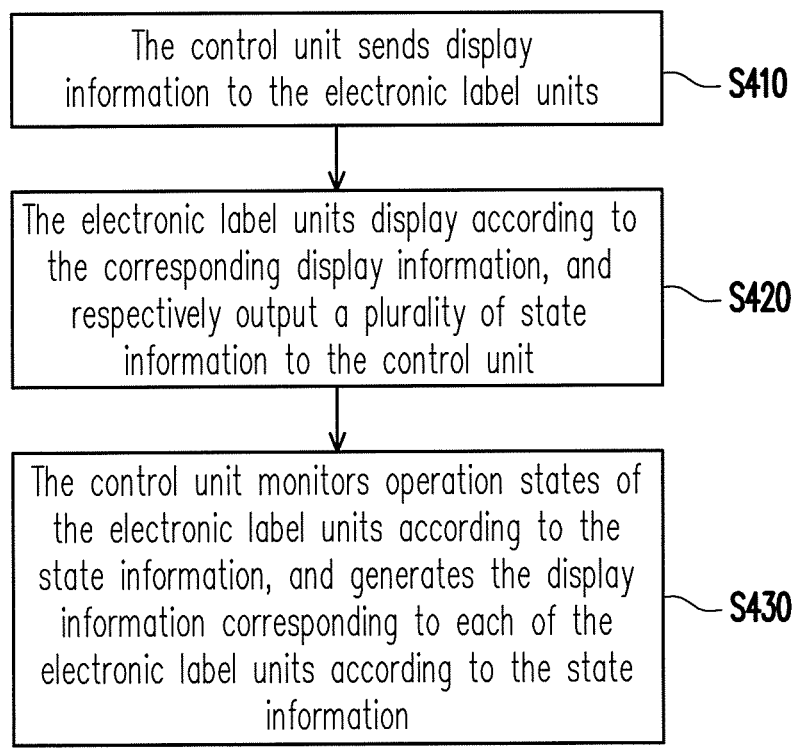
FIG. 4 is a flowchart illustrating an operation method of an electronic label system according to an embodiment of the invention.

FIG. 4 is a flowchart illustrating an operation method of an electronic label system according to an embodiment of the invention. Referring to FIG. 4, in the present embodiment, the electronic label system, for example, includes a control unit and a plurality of electronic label units. In step S410, the control unit sends display information to the electronic label units. In step S420, the electronic label units display according to the corresponding display information, and respectively output a plurality of state information to the control unit. Then in step S430, the control unit monitors operation states of the electronic label units according to the state information, and generates the display information corresponding to each of the electronic label units according to the state information. A sequence of the above steps are only used for descriptions, and the invention is not limited thereto. Please refer to the related descriptions of the electronic label systems 100 and 200 for the details of the steps, which are not repeated herein.

Accordingly, in the embodiments as exemplarily disclosed in FIG. 1 to FIG. 4, the electronic label units may transmit back state information, and the control unit monitors the operation states of the electronic label units according to the transmitted state information. Moreover, the control unit adjusts a message content, a size or a format of the display information according to the transmitted state information, so that the electronic label units can correctly receive the display information. In addition, the electronic label units are wirelessly charged via wireless communications, such that power management of the electronic label units of the electronic label system may be fundamentally improved.

Figure 5:
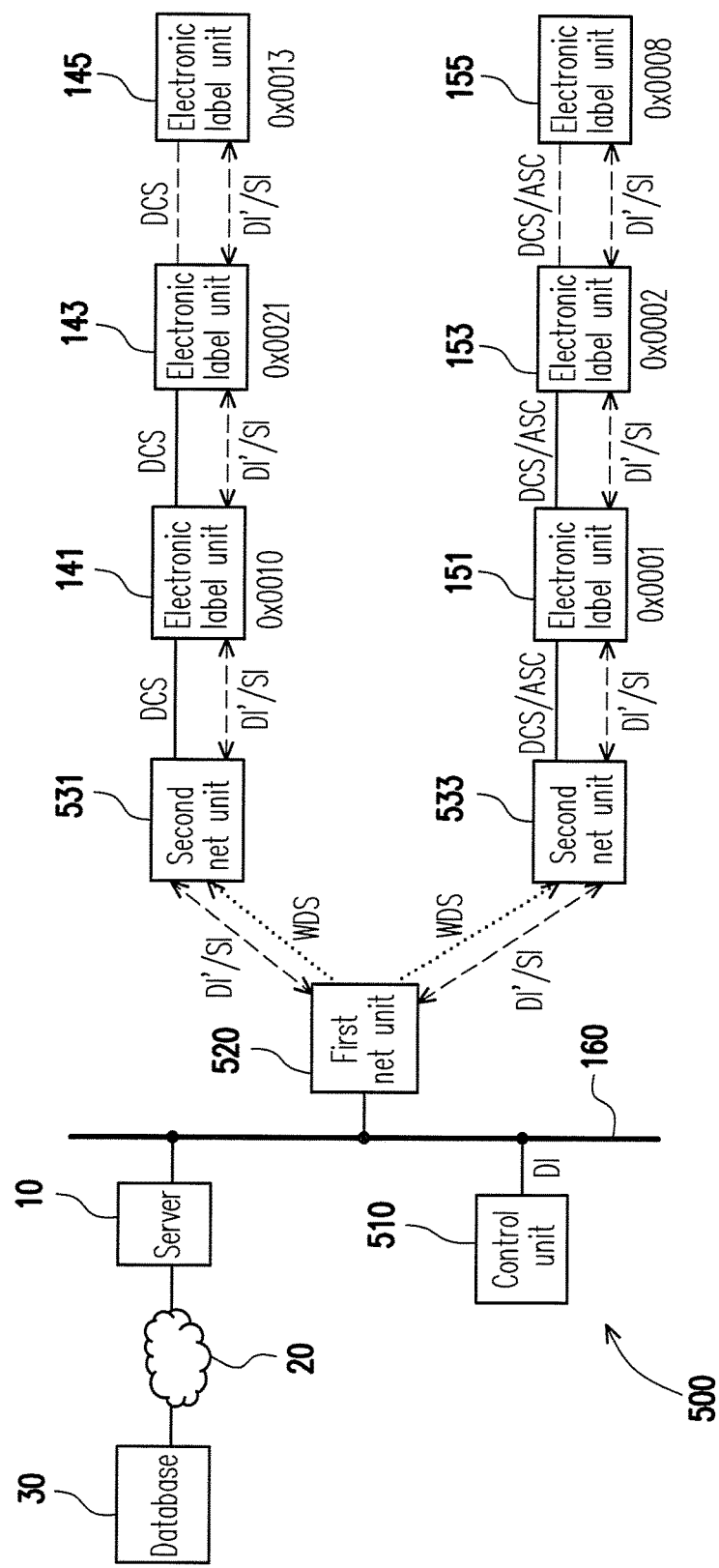
FIG. 5 is a schematic system diagram of an electronic label system according to another embodiment of the invention.

FIG. 5 is a schematic system diagram of an electronic label system according to another embodiment of the invention. Referring to FIG. 5, in the present embodiment, an electronic label system 500 includes a control unit 510, a first net unit 520, two second net units 531 and 533 and a plurality of electronic label units (such as 141, 143, 145, 151, 153 and 155). The control unit 510 is for sending out a display information DI. The first net unit 520 is coupled to the control unit 510 through a line 160 to convert the display information DI into a wireless display signal WDS. The second net units 531 and 533 are coupled to the first net unit 520 for receiving the wireless display signal WDS and outputting a display control signal DCS.

The electronic label units 141, 143 and 145 are coupled in series to the second net unit 531 for receiving the display control signal DCS and respectively displaying according to the corresponding display control signal DCS. The electronic label units 151, 153 and 155 are coupled in series to the second net unit 533 for receiving the display control signal DCS and respectively displaying according to the corresponding display control signal DCS. In some embodiments, the second net units 531 and 533 are able to display, so that the second net units 531 and 533 can display according to the corresponding display control signal DCS.

In the present embodiment, the electronic label units 141, 143, 145, 151, 153 and 155 are respectively corresponding to an address, and the display information DI (corresponding to the display control signal DCS) also contains an address information so that the electronic label units 141, 143, 145, 151, 153 and 155 can identify and receive the corresponding display control signal DCS. For example, if the display information DI contains an address information of 0x0010, the corresponding display control signal DCS is corresponding to the electronic label unit 141 and the electronic label unit 141 would display according to the corresponding display control signal DCS.

Taking the electronic label units 141, 143 and 145 as an example, the display control signal DCS can be simultaneously sent to the electronic label units 141, 143 and 145; or the display control signal DCS is sent to the electronic label unit 141 first, and if the display control signal DCS is not corresponding to the electronic label unit 141, the display control signal DCS would be sent to the electronic label unit 143 from the electronic label unit 141, and analogically for the rest. In addition, the address range of the electronic label units 141, 143, 145, 151, 153 and 155 is corresponding to the quantity of the connected address lines of the electronic label units 141, 143, 145, 151, 153 and 155. For example, if the quantity of the address lines is 3, the address range is 0x0000(0)-0x0007(7); if the quantity of the address lines is 10, the address range is 0x0000(0)-0x03FF(1023).

In addition, the addresses of the electronic label units 141, 143, 145, 151, 153 and 155 can be a fixed address or assigned according to the coupling relationship. In the present embodiment, assuming the addresses of the electronic label units 141, 143 and 145 are fixed addresses, i.e., three addresses of 0x0010, 0x0021 and 0x0013 are respectively written to the electronic label units 141, 143 and 145 during fabrication. In the present embodiment, assuming the addresses of the electronic label units 151, 153 and 145 are automatically assigned, then after starting, the second net unit 533 sends an address setting instruction ASC and a starting address (for example, 0x0001) to the electronic label unit 151 to set the address of the electronic label unit 151 as 0x0001; next, the electronic label unit 151 sends an address setting instruction ASC and a starting address 0x0002 (i.e., 0x0001+1) to the electronic label unit 153 to set the address of the electronic label unit 153 as 0x0002; in this way, if the electronic label unit 155 is the eighth electronic label unit, the address of the electronic label unit 155 is set as 0x0008.

In an embodiment of the invention, the line 160 can be an Ethernet line, i.e., the first net unit 520 is coupled to the control unit 510 through the Ethernet network, but in other embodiments, the line 160 can be an internal integrated circuit (I2C) interface circuit, a serial peripheral interface (SPI) circuit, an RS232 interface circuit or an ARM bus line. The wireless display signal WDS can be a wireless signal which conform to one of the WiFi protocol, ZigBee protocol and third generation (3G) mobile communications protocol or one of RF wireless signals of other types, i.e., the second net units 531 and 533 can be coupled to the first net unit 520 through one of a WiFi protocol, a ZigBee protocol and a third generation (3G) mobile communications protocol. The electronic label units 141, 143 and 145 are coupled in series to the second net unit 531 through one of the internal integrated circuit (I2C) interface circuit, the serial peripheral interface (SPI) circuit, the RS232 interface circuit and the ARM bus line, and in the same way, the electronic label units 151, 153 and 155 are coupled in series to the second net unit 533 through one of the internal integrated circuit (I2C) interface circuit, the serial peripheral interface (SPI) circuit, the RS232 interface circuit and the ARM bus line.

In the present embodiment, the control unit 510 is coupled to the server 10 through the line 160 so as to obtain the display data corresponding to the electronic label units 141, 143, 145, 151, 153 and 155 from the server 10, and at the time, the display information DI (corresponding to the display control signal DCS) corresponding to the electronic label units 141, 143, 145, 151, 153 and 155 are generated. Moreover, the server 10 can be coupled to the database 30 through a virtual private-area network 20 established in wide-area network so as to update the display information DI corresponding to the electronic label units 141, 143, 145, 151, 153 and 155 through the database. In other embodiments, the server 10 can be coupled to the database 30 through an LAN (local area network), which the invention is not limited to. The server 10 can receive a remote instruction and output the display data to the control unit 510 according to the remote instruction. By means of the display information DI sent by the control unit 510, the display frame of partial, whole or one of the electronic label units 141, 143, 145, 151, 153 and 155 is controlled.

Figure 6:
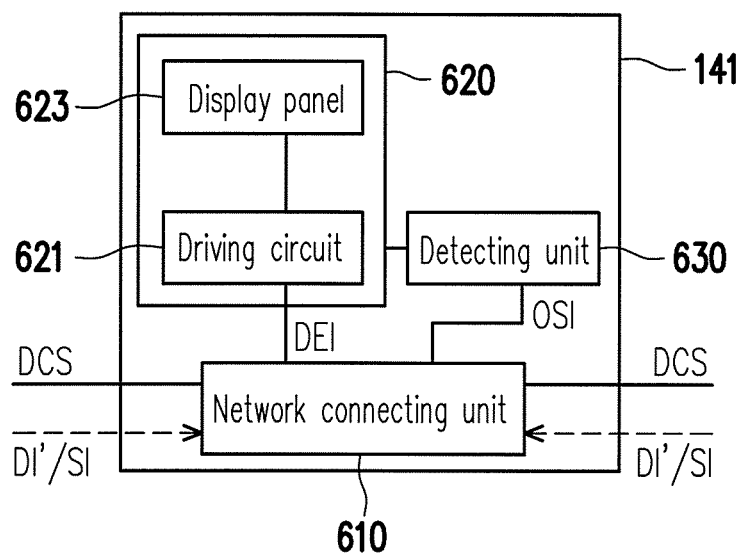
FIG. 6 is a schematic circuit diagram of an electronic label unit according to another embodiment of the invention.

FIG. 6 is a schematic circuit diagram of an electronic label unit according to another embodiment of the invention. Referring to FIG. 5 and FIG. 6, the electronic label unit 141 is taken as an example, while the rest electronic label units (such as 143, 145, 151, 153 and 155) can be analogically deducted for understanding. In the present embodiment, the electronic label unit 141 includes a network connecting unit 610, a display unit 620, and a detecting unit 630. The display unit 620 includes a driving circuit 621 and a display panel 623. The network connecting unit 610 of the electronic label unit 141 is coupled to the network connecting unit 610 of the adjacent electronic label unit 143 and the second net unit 531. The driving circuit 621 is coupled to the display panel 623 and the network connecting unit 610 to receive the display control signal DCS through the network connecting unit 610 and drive the display panel 623 for displaying according to the corresponding display control signal DCS. The display panel 623 herein can be a liquid crystal display panel or an electrophoretic display panel, which the invention is not limited to. The address (0x0010) corresponding to the electronic label unit 141 can be saved at the network connecting unit 610 or the driving circuit 621.

In more details, if the address corresponding to the electronic label unit 141 is saved at the network connecting unit 610, when the network connecting unit 610 receives the display control signal DCS, it is judged whether or not the received one is the corresponding display control signal DCS. If it is the corresponding display control signal DCS, the signal is transmitted to the driving circuit 621; if it is not the corresponding display control signal DCS, the signal is transmitted to the electronic label unit 143.

On the other hand, if the address corresponding to the electronic label unit 141 is saved at the driving circuit 621, when the network connecting unit 610 receives the display control signal DCS, the signal is transmitted to the driving circuit 621 so as it is judged through the driving circuit 621 whether or not the received one is the corresponding display control signal DCS. If it is the corresponding display control signal DCS, the driving circuit 621 would drive the display panel 623 according to the display control signal DCS; if it is not the corresponding display control signal DCS, the driving circuit 621 would transmit the display control signal DCS through the network connecting unit 610 to the electronic label unit 143. Or, when the network connecting unit 610 receives the display control signal DCS, the signal is transmitted to the driving circuit 621 and the electronic label unit 143. If it is the corresponding display control signal DCS, the driving circuit 621 would drive the display panel 623 according to the display control signal DCS; if it is not the corresponding display control signal DCS, the driving circuit 621 would do nothing regardless the display control signal DCS.

The detecting unit 630 is coupled to the network connecting unit 610 and the display unit 620 for detecting operation state information OSI of the display unit 620, and outputting the operation state information OSI to the network connecting unit 610, where the operation state information OSI may include one of or all of an operating temperature and an operating voltage of the display unit 620. The network connecting unit 610 receives the device information DEI and/or the operation state information OSI, and outputs the corresponding state information SI according to the device information DEI and/or the operation state information OSI.

Accordingly, the electronic label units 141, 143, 145, 151, 153 and 155 of the present embodiment may respectively output a plurality of state information to the control unit 510, so that the control unit 510 monitors operation states of the electronic label units 141, 143, 145, 151, 153 and 155 according to the state information. Regarding the operation state monitoring, the operation method of the electronic label system described in the present embodiment of the invention is sufficiently taught, suggested, and embodied in the embodiments illustrated in FIG. 1 to FIG. 4, and therefore no further description is provided herein.

In the present embodiment, each of the electronic label units 141, 143, 145, 151, 153 and 155 may further include a power processing unit (not shown) for wirelessly charging. The electronic label units 141, 143, 145, 151, 153 and 155 of the electronic label system 500 are wirelessly chargeable. Please refer to the related descriptions of the electronic label unit 300 for the details, which are not repeated herein.

Accordingly, in the embodiments as exemplarily disclosed in FIG. 5 to FIG. 6, the electronic label units may transmit back state information, and the control unit monitors the operation states of the electronic label units according to the transmitted state information. Moreover, the control unit adjusts a message content, a size or a format of the display information according to the transmitted state information, so that the electronic label units can correctly receive the display information. In addition, the electronic label units are wirelessly charged via wireless communications, such that power management of the electronic label units of the electronic label system may be fundamentally improved. In addition, a wired communication interface is used as the communication interface between the second net unit and the electronic label units in the electronic label system, so that the cost of the electronic label system is reduce reduced.

In summary, in the exemplary embodiments of the invention, the electronic label units transmit back a plurality of state information, so that a control unit is capable of monitoring operation states of the electronic label units, and generating display information corresponding to each of the electronic label units according to the state information of each of the electronic label units. The electronic label system uses a wired communication interface as the communication interface between the net unit and the electronic label units so as to reduce the cost of the electronic label system. In addition, the electronic label units of the electronic label system are wirelessly chargeable.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An electronic label system, comprising:
    a control unit, sending display information;
    a first net unit, coupled to the control unit, and configured to convert the display information into a display signal;
    a second net unit, coupled to the first net unit, and configured to receive the display signal and output a display control signal; and
    a plurality of electronic label units, coupled in series to the second net unit, and configured to receive the display control signal and to respectively display according to the corresponding display control signal, wherein the electronic label units respectively output a plurality of state information to the control unit, so that the control unit monitors operation states of the electronic label units according to the state information,
    wherein the state information is transmitted to the control unit when a state of the electronic label units is varied.

2. The electronic label system as claimed in claim 1, wherein each of the electronic label units comprises:
    a network connecting unit, wherein the network connecting unit of each of the electronic label units is coupled to the network connecting unit of the adjacent electronic label unit or the second net unit; and
    a display unit, coupled to the network connecting unit to receive the display control signal through the network connecting unit and display according to the display control signal.

3. The electronic label system as claimed in claim 2, wherein each of the electronic label units further comprises:
    a detecting unit, coupled to the network connecting unit and the display unit, and configured to detect operation state information of the display unit, and output the operation state information to the network connecting unit,
    wherein the network connecting unit outputs the corresponding state information according to the device information and the operation state information.

4. The electronic label system as claimed in claim 1, wherein the control unit generates the display information corresponding to each of the electronic label units according to the state information.

5. The electronic label system as claimed in claim 1, wherein each state information comprises a part of, all of or one of an operating temperature, an operating voltage, a display resolution and a display panel type.

6. The electronic label system as claimed in claim 1, wherein the electronic label units are respectively corresponding to an address.

7. The electronic label system as claimed in claim 6, wherein the second net unit sends out an address setting instruction and a starting address so that the electronic label units sequentially set the corresponding address respectively according to the coupling relationship.

8. The electronic label system as claimed in claim 7, wherein the address range of the electronic label units is corresponding to the quantity of connected address lines of the electronic label units.

9. The electronic label system as claimed in claim 6, wherein the second net unit sends out an address setting instruction and a starting address to the electronic label units, so that the electronic label units sequentially set the corresponding address respectively according to the received starting address, and the electronic label units sequentially output the address setting instruction and the starting address increased by 1 to the next electronic label unit.

10. The electronic label system as claimed in claim 6, wherein the electronic label units are respectively corresponding to a fixed address.

11. The electronic label system as claimed in claim 1, wherein the display control signal received corresponds to the electronic label unit, the electronic label unit displays according to the corresponding display control signal, and when the display control signal does not correspond to the electronic label unit, the display control signal is sent to the next electronic label unit.

12. The electronic label system as claimed in claim 1, wherein the display signal is a wireless display signal, the first net unit converts the display information into the wireless display signal, and the second net unit receives the wireless display signal.

13. An electronic label system, comprising:
    a control unit, transmitting wireless power; and
    a plurality of electronic label units, coupled to the control unit, and configured to respectively output a plurality of state information to the control unit, so that the control unit monitors operation states of the electronic label units according to the state information, and the state information is transmitted to the control unit when a state of the electronic label units is varied,
    wherein the control unit transmits the wireless power to at least one of the electronic label units by using wireless communications, and the at least one of the electronic label units are charged with the wireless power.

14. The electronic label system as claimed in claim 13, further comprising:
    a network unit, coupled between the control unit and the electronic label units, wherein the control unit transmits the wireless power to the electronic label units through the network unit via a wireless signal, and the electronic label units respectively transmit the corresponding state information to the network unit through the wireless signal, so as to transmit the state information to the control unit.

15. The electronic label system as claimed in claim 14, wherein the electronic label units are coupled in series to the net unit, and respectively output the state information to the control unit through the network unit.

16. The electronic label system as claimed in claim 14, wherein each of the electronic label units comprises:
    a network connecting unit, coupled to the network unit;
    a display unit, coupled to the network connecting unit, and configured to receive display information transmitted from the control unit through the network connecting unit, display according to the display information, and output device information to the network connecting unit; and a detecting unit, coupled to the network connecting unit and the display unit, and configured to detect operation state information of the display unit, and outputting the operation state information to the network connecting unit, wherein the network connecting unit outputs the corresponding state information according to the device information and the operation state information.

17. The electronic label system as claimed in claim 14, wherein each of the electronic label units comprises:

a power processing unit coupled to the network connecting unit, and configured to receive the wireless power, storing the wireless power, monitor the stored wireless power, and request transmission of the wireless power from the network unit.

18. The electronic label system as claimed in claim 17, wherein the power processing unit comprises:

a power reception unit, coupled to the network connecting unit, and configured to receive the wireless power.

19. The electronic label system as claimed in claim 18, wherein the power processing unit further comprises:

a power storage unit, coupled to the power reception unit, and configured to be charged with the wireless power received by the power reception unit, and store the wireless power; and a power management unit, coupled to the network connecting unit, and configured to monitor the stored wireless power, and request transmission of the wireless power from the network unit.

20. The electronic label system as claimed in claim 13, wherein the control unit generates display information corresponding to each of the electronic label units according to the state information, and transmits the display information to the electronic label units for displaying.

* * * * *